United States Patent [19]

Cornax

[11] Patent Number: 5,183,223
[45] Date of Patent: Feb. 2, 1993

[54] INTERLOCKING RING FAN JET ENGINE SUPPORT SYSTEM

[75] Inventor: Dennis Cornax, Chula Vista, Calif.

[73] Assignee: Rohr, Inc., Chula Vista, Calif.

[21] Appl. No.: 722,254

[22] Filed: Jun. 27, 1991

[51] Int. Cl.$^5$ .............................................. B64D 27/00
[52] U.S. Cl. .................................... 244/54; 60/39.31; 248/554
[58] Field of Search .................... 244/54, 55; 60/39.31; 248/554, 555, 556, 557

[56] References Cited

U.S. PATENT DOCUMENTS

| | | | |
|---|---|---|---|
| 3,979,087 | 9/1976 | Boris et al. | 248/554 |
| 4,458,863 | 7/1984 | Smith | 244/54 |
| 4,683,717 | 8/1987 | Naud | 60/39.31 |
| 5,004,402 | 4/1991 | Burchette et al. | 415/209.2 |

FOREIGN PATENT DOCUMENTS

| | | | |
|---|---|---|---|
| 0333919 | 9/1989 | European Pat. Off. | 60/39.31 |
| 1199624 | 8/1965 | Fed. Rep. of Germany | 244/54 |
| 744473 | 2/1956 | United Kingdom | 244/54 |

*Primary Examiner*—Joseph F. Peters, Jr.
*Assistant Examiner*—Anne E. Bidwell
*Attorney, Agent, or Firm*—Patrick J. Schlesinger; Frank D. Gilliam

[57] ABSTRACT

A support system for the aft end of fan jet gas turbine engines which reduces engine bending in operation while accommodating radial and longitudinal thermal expansion forces. A first radial ring secured to the engine structure core cowl and the overall engine support pylon has a plurality of spaced longitudinal grooves. A second, cooperating radial ring secured to the engine has a plurality of outwardly extending tabs sized to fit within the first ring grooves. The tabs do not extend fully into the grooves at ambient temperatures. When operation of the engine begins, the engine heats up to a relatively high temperature. Radial thermal expansion is accommodated by expansion of the inner ring, causing the tabs to move deeper into the grooves. Longitudinal thermal expansion is accommodated by slippage of the tabs along the grooves in a longitudinal direction. Meanwhile, the engine is supported against bending and flexing beyond the amount permitted by the space between tab ends and bottoms of the grooves.

2 Claims, 2 Drawing Sheets

INTERLOCKING RING FAN JET ENGINE SUPPORT SYSTEM

BACKGROUND OF THE INVENTION

This invention relates in general to fan jet gas turbine engines and, more specifically, to a system for supporting the aft engine of the engine against bending forces.

In conventional fan jet engines of the sort used in large commercial aircraft, the engine cowling is supported within the engine nacelle near the front through an annular array of struts. Since the engine is relatively narrow and "wasp waisted", it is subject to bending and flexing in operation causing a number of problems, such as metal fatigue, fastener loosening, etc. Also, these movements can lead to increased turbine blade clearances and lower engine efficiency with resulting lower fuel efficiency.

Attempts have been made to reduce bending and flexing by adding supports near the aft end of the engine. Such supports have a number of problems accommodating the radial and longitudinal thermal expansion of the engine during operation. Prior supports tend to be heavy and complex, adding fuel consuming weight to the aircraft and adding opportunity for errors in mounting the engine and potential for failures in operation.

Typical of these proposed aft engine supports is the complex system of annular teeth and grooves with radial pins and ball joints described by Naud in U.S. Pat. No. 4,683,717 and the complex system described by Pachomoff et al in U.S. Pat. No. 4,742,975 which requires the addition of safety rods to protect against failure of the support system.

Thus, there is a continuing need for an engine support system which is simple, light weight and accommodates radial and longitudinal engine thermal expansion during use.

SUMMARY OF THE INVENTION

It is, therefor, an object of this invention to provide an engine support system overcoming the above-noted problems. Another object is to provide an engine support of improved simplicity and reliability. A further object is to provide a light weight and effective engine support system. Still another object is to provide an engine support system that can accommodate radial and longitudinal thermal expansion in an engine during operation.

The above objects, and others, are accomplished in accordance with this invention, basically, by a support system for the aft end of the engine core in a fan jet type gas turbine engine that consists of two interlocking rings, a first, outer, ring secured around its circumference to the engine structural core cowl and to the engine pylon and a second, inner, ring secured around its circumference to the engine core.

The first ring has a plurality of spaced, inwardly opening, longitudinal grooves. The second ring has a corresponding plurality of outwardly extending tabs that fit partially (at normal ambient temperature) into the grooves. When engine operation begins, the engine heats up, causing radial and longitudinal expansion of the engine. With high heat, the tabs accommodate radial expansion by extending further into the grooves and accommodate longitudinal expansion by sliding aft along the grooves a short distance. This arrangement provides a homogeneous beam made up of engine core and core cowl, increasing engine stiffness and reducing engine flexing and bending.

While the primary emphasis is on engines for use in aircraft, the support system, of course, has utility in other fan type gas turbine engine applications, such as power sources for electrical generating plants and the like.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
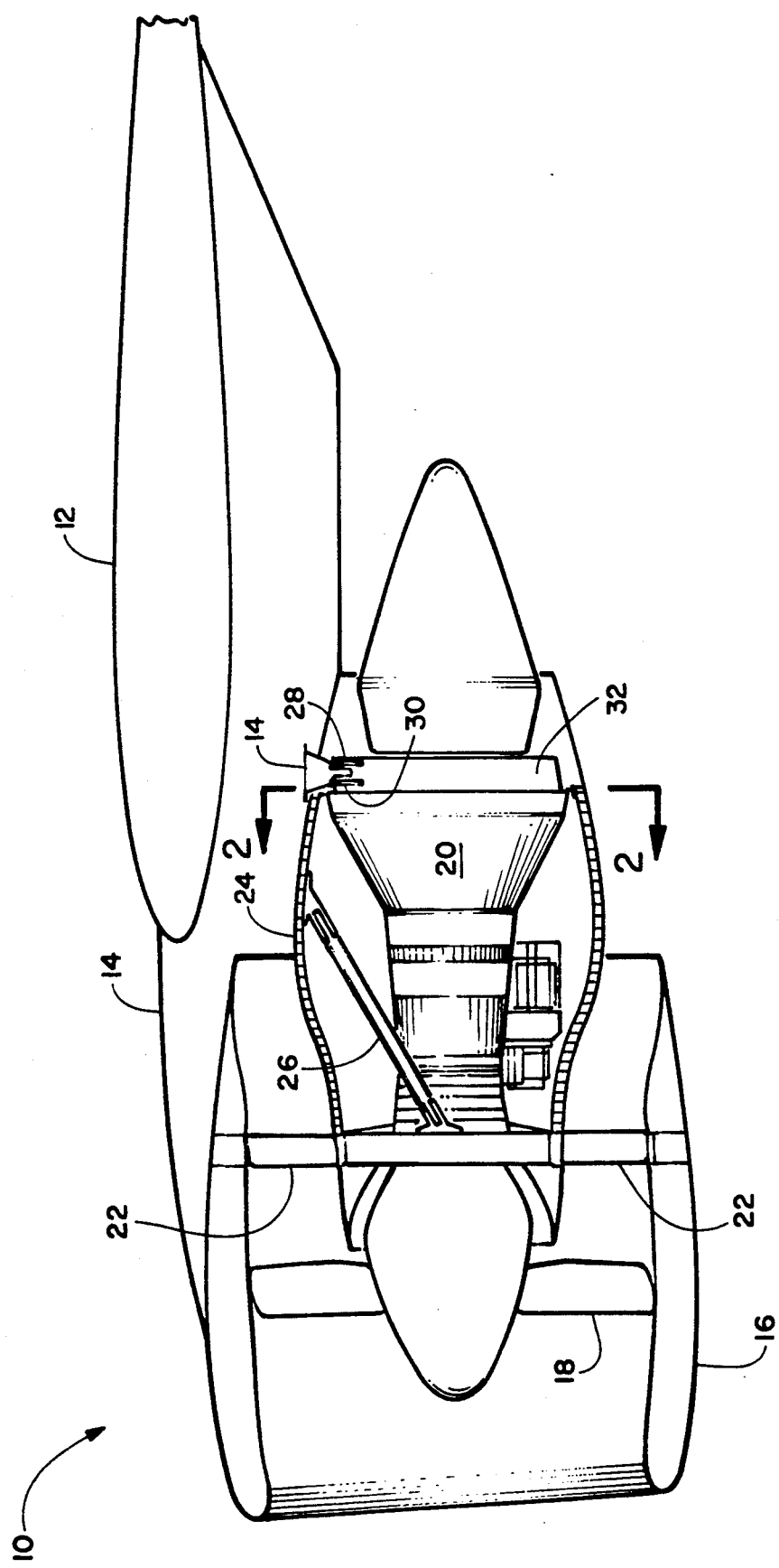
FIG. 1 is a schematic side elevation view, partially cutaway, of a fan type gas turbine engine using the support system of this invention.

Referring now to FIG. 1, there is seen a schematic side view of a fan type aircraft gas turbine engine 10 mounted on a wing 12 by a pylon 14. The engine nacelle 16 within which fan blades 18 rotate is secured to pylon 14. Engine core 20 is enclosed in core cowl 24 which is mounted at its forward end to nacelle 16 by supports 22. A brace 26 aids in supporting core cowl 24. As can be seen, engine core 20 is relatively narrow in the central portion and susceptible to bending or flexing when varying loads are imposed thereon.

Figure 2:
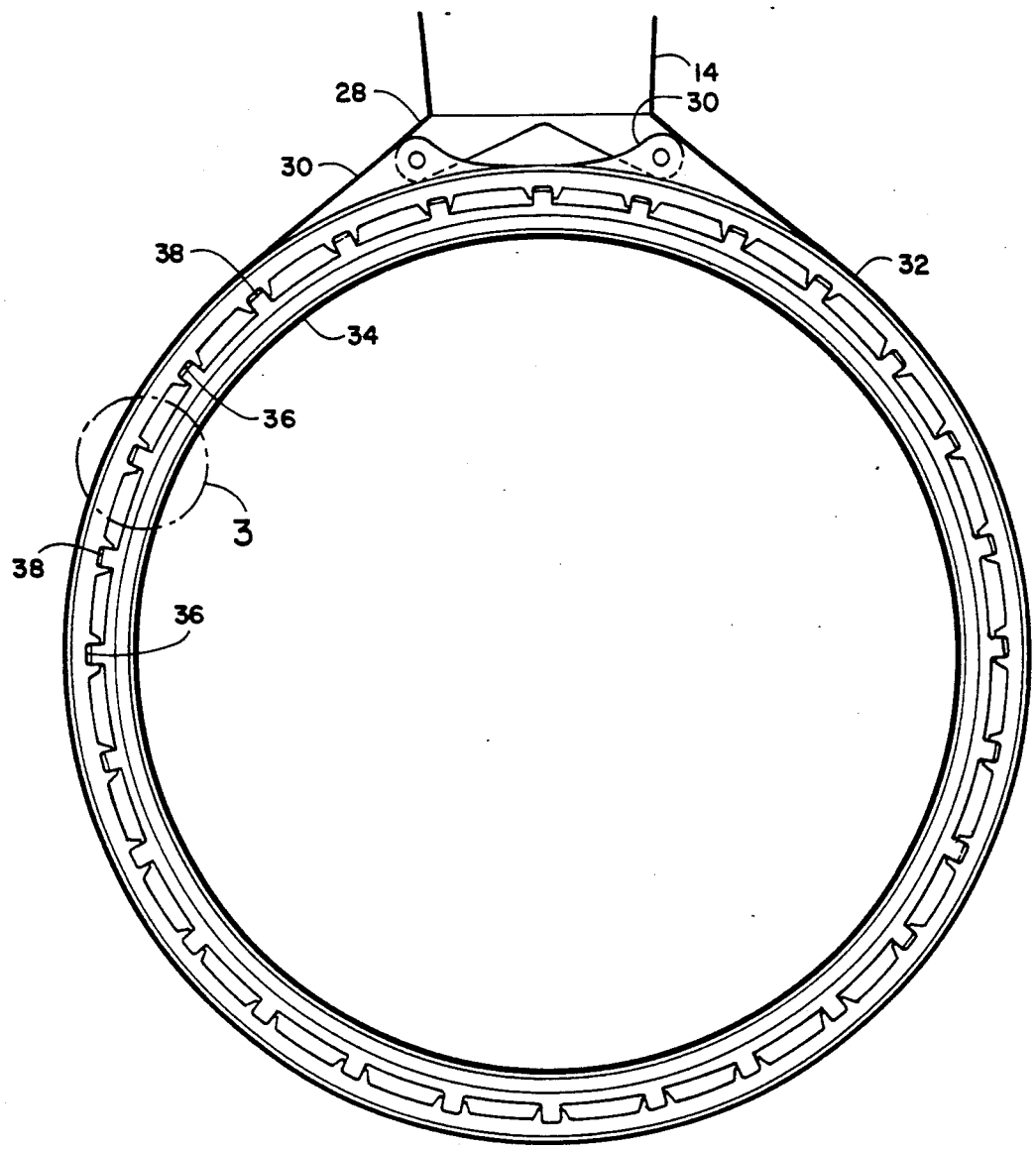
FIG. 2 is a schematic section view taken on line 2—2 in FIG. 1.

The aft end of core cowl 24 is supported by an attachment plate 28 fastened to pylon 14 as seen in FIGS. 1 and 2. As seen in FIG. 2, plate 28 is bifurcated with two rounded ends that are overlapped by flanges 30 on core first ring 32. Ring 32 is fastened to cowl 24 around its circumference.

Figure 4:
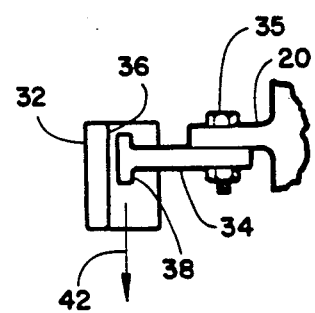
FIG. 4 is a schematic section view taken on line 4—4 in FIG. 3.

A second ring 34 is positioned within cowl ring 32 and is secured to engine 20 (as seen in FIG. 4) around its circumference typically by a ring of bolts 35.

Figure 3:
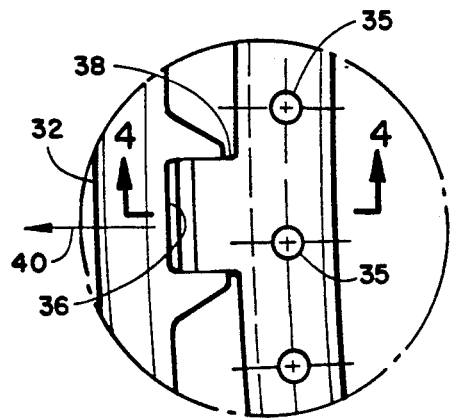
FIG. 3 is an enlarged detail view of area A in FIG. 1.

First ring 32 has a plurality of longitudinal grooves 36 spaced in a selected pattern around the circumference of the ring. Second ring 34 has a correspondingly arranged plurality of outwardly extending tabs 38 meshed with grooves 36. As best shown in FIG. 3, at ambient temperatures, tabs 38 do not extend entirely into grooves 36 to allow room for radial expansion in the direction indicated by arrow 40 as the engine heats up during operation.

As best seen in FIG. 4, grooves 36 have sufficient longitudinal length to permit tab 38 to slid therealong, as indicated by arrow 42, when the engine heats up during operation.

The support ring assembly is light weight and mechanically very simple and very unlikely to experience any mechanical failure in use.

Other applications, variations and ramifications of this invention will occur to those skilled in the art upon reading this disclosure. Those are intended to be included within the scope of this invention, as defined in the appended claims.

I claim:

1. A load sharing support system for supporting the engine core of a fan jet gas turbine engine in which the forward end of the core is fixed to the forward part of the engine, which comprises:

a first ring surrounding the aft portion of a fan jet engine and fastened to an engine cowl;

means for securing said first ring to a pylon mounted on an aircraft;

a second ring surrounding and fastened to the aft portion of said engine;

said first ring having a plurality of inwardly extending longitudinal grooves opening inwardly of said first ring; and said second ring having a plurality of outwardly extending tabs corresponding to said grooves and adapted to mesh with said grooves, said tabs do not extend entirely into said grooves at ambient temperature, whereby radical thermal expansion as the engine heats up to operating temperature is accomplished by expansion of said tabs further into said grooves, said grooves have sufficient length to permit longitudinal movement of said tabs therealong to accommodate longitudinal thermal expansion of said engine between ambient and operating temperatures.

2. A support means for a fan jet type gas turbine engine having an engine nacelle secured to an aircraft pylon, and engine core within said engine nacelle housed in a structural core cowl and secured neat its forward end to said nacelle, the improvement comprising:

a first ring transverse to the engine and secured to the engine core cowl;

faster means securing said first ring to the engine pylon near the aft end of the core cowl;

a second ring transverse to the engine and secured to the engine;

said first ring having a plurality of longitudinal, inwardly opening, grooves spaced in a selected arrangement around the circumference of said first ring; and said second ring having a plurality of outwardly extending tabs in a pattern adapted to mesh with said grooves, said tabs do not extend entirely into said grooves at ambient temperatures, whereby radial thermal expansion as the engine heats up to operating temperature is accommodated by expansion of said tabs further into said grooves, said grooves have sufficient length to permit longitudinal movement of said tabs therealong to accommodate longitudinal thermal expansion of said engine between ambient and operating temperatures.

* * * * *